United States Patent [19]
Reed

[11] Patent Number: 6,058,603
[45] Date of Patent: May 9, 2000

[54] METHOD FOR TERMINATING NON-METALLIC TRANSMISSION CABLES

[75] Inventor: William C. Reed, Greensboro, N.C.

[73] Assignee: Lucent Technologies Inc., Murray Hill, N.J.

[21] Appl. No.: 09/172,480

[22] Filed: Oct. 14, 1998

Related U.S. Application Data

[62] Division of application No. 08/949,803, Oct. 14, 1997.

[51] Int. Cl.[7] .................................................. H01R 43/00
[52] U.S. Cl. ............................ 29/857; 29/828; 29/854; 29/861; 29/862; 29/863; 29/866; 29/867; 174/84 R; 428/375; 428/396
[58] Field of Search ........................... 29/857, 860, 828, 29/854, 861, 867, 866, 863, 862; 174/84 R, 88 C; 428/396, 395, 375

[56] References Cited

U.S. PATENT DOCUMENTS

| | | | |
|---|---|---|---|
| 3,908,668 | 9/1975 | Bolduc | 128/419 P |
| 4,088,385 | 5/1978 | Adkins | 339/143 |
| 4,345,370 | 8/1982 | Cartier et al. | 29/828 |
| 4,615,115 | 10/1986 | Bosshard et al. | 29/860 |
| 4,818,060 | 4/1989 | Arroyo | 350/96.23 |
| 5,127,853 | 7/1992 | McMills et al. | 439/578 |
| 5,354,204 | 10/1994 | Hughes | 439/35 |
| 5,389,442 | 2/1995 | Arroyo et al. | 428/396 |
| 5,473,117 | 12/1995 | Morgan et al. | 174/78 |
| 5,480,325 | 1/1996 | Tran et al. | 439/578 |
| 5,514,009 | 5/1996 | Hughes | 439/35 |
| 5,768,771 | 6/1998 | O'Sullivan et al. | 29/828 |

*Primary Examiner*—Lee Young
*Assistant Examiner*—Binh-An Nguyen

[57] ABSTRACT

This invention relates to non-metallic, corrosion-resistant strength systems for underwater power and communications systems and methods for terminating such cables. The strength system comprises two non-metallic strength members; each strength member is comprised of at least one glass strand, and each strand is comprised of a plurality of glass filaments that are bound together with a polymeric material. The first strength member is applied in a helical lay over transmission media which forms the core of the cable, and the second strength member is applied over the lay of the first strength member in a helical lay having a circular direction opposite to the lay of the first strength member. The invention further embraces a method of terminating such cables involving the use of an inner termination cone, an adhesive used to secure the strength members onto the inner termination cone, and an outer termination cone which is secured over the inner termination cone and adjoining strength members.

12 Claims, 7 Drawing Sheets

FIG. 7
FIG. 6
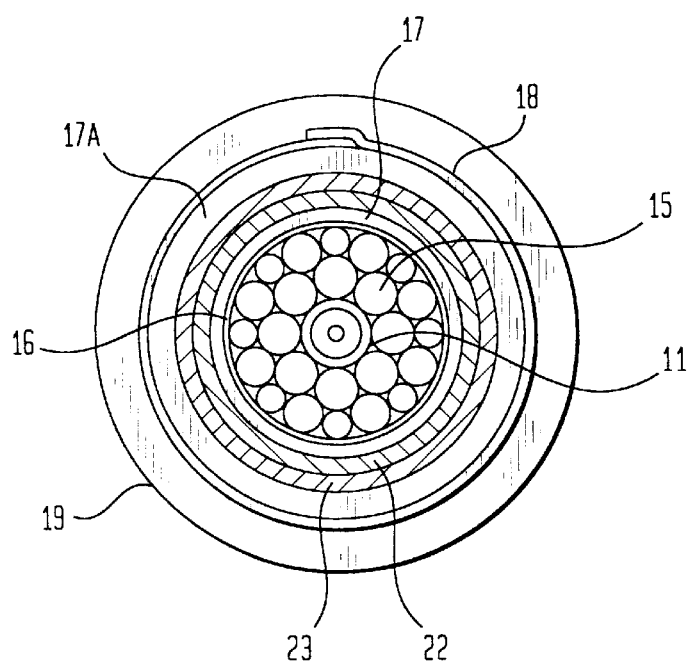
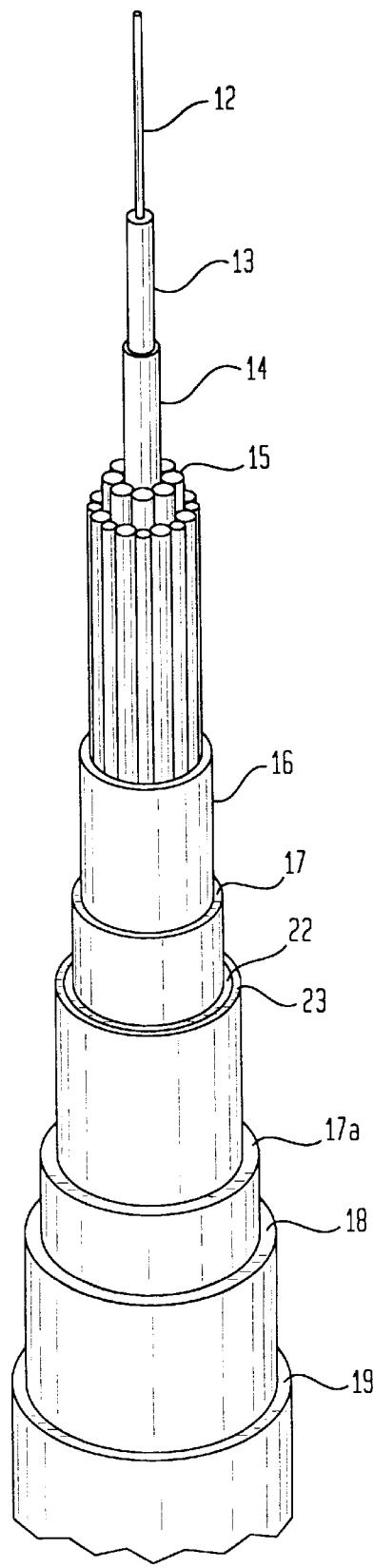

METHOD FOR TERMINATING NON-METALLIC TRANSMISSION CABLES

RELATED APPLICATIONS

This case is a divisional of U.S. application Ser. No. 08/949,803, filed Oct. 14, 1997, pending.

FIELD OF THE INVENTION

This invention relates to non-metallic, corrosion-resistant strength systems for transmission cables and, more particularly, non-metallic cables for underwater power and communications systems. The invention further relates to a method for terminating such cables.

BACKGROUND OF THE INVENTION

Corrosion is a major concern with underwater transmission cables, as the underwater environment is deleterious to cables in many ways. The cables are often exposed to collision with commercial fishing gear and other apparatus. Collision with fishing gear may destroy the cables or cause nicks or punctures in the cable outer jackets, exposing the inner transmission wires to sea water. The sea water environment is particularly corrosive due to its potential to interact with the metallic surface of transmission cables and produce hydrogen or hydroxyl ions, creating concern for hydrogen-induced attenuation of the cable or inner fibers. In the sea water environment, there is also a current-induced corrosion factor, i.e., the ocean current acts as an electrical current which, upon passing through the earth's magnetic field, produces a Hall effect to create a potential field along a cable and cause accelerated corrosion. Abrasion caused by wave and current action can further be a source of corrosion.

Traditionally, underwater cables have been strengthened and protected by layers of armor or jackets surrounding the core that contains communications and/or power transmission media. The use of materials considered to be corrosion-resistant has also been employed to address the impact of the sea environment. Stainless steel alloys, for example, have commonly been considered a preferred corrosion resistant material for use in protecting underwater transmission media.

To illustrate, FIGS. 1 and 2 show a traditional deep water trunk power and communications transmission system 90. FIG. 1 shows a cross-sectional view along the line 10—10 of FIG. 2, which shows a perspective side view of the cable, with the layers exposed. A fiber optic core structure 1 is centrally disposed in the system. Referring to FIG. 2, the core structure 1 comprises an optical fiber 2, buffer coating 3, and buffer jacket 4. As seen in FIGS. 1 and 2, the core structure 1 is surrounded with a plurality of steel strands 5 which are selected and arranged to densely pack a circular cross-section surrounding the fiber optic core structure 1. The fiber optic core structure 1 and steel strands 5 serve, respectively, as communications transmission media and power transmission media. The steel strands also serve to strengthen and protect the cable. A welded swaged copper tube 6 surrounds the steel strands, providing a pressure barrier to absorb and more uniformly distribute underwater pressures to protect the core structure 1 from damage. The copper tube 6 may also serve to balance torque by resisting any torque that is imposed upon the cable by the steel strands. Insulation 7, an electrical and mechanical shield 8, and a protective jacket 9 form successive cylindrical layers surrounding the welded swaged copper tube 6.

Such prior art underwater cables utilizing steel strength systems have several disadvantages, however. Steel has lower electrical conductivity than other materials that may be used for power or communications media such as, for example, copper. Thus, to achieve the same conductivity as when other transmission materials (e.g., copper) are used, the steel strands used as a transmission medium must have a larger cross section which adversely impacts on the weight and rigidity of the cables being used. Steel strands used as a power transmission or communications transmission medium also must be electrically insulated and corrosion protected throughout the cable system.

Other disadvantages of using steel in systems for transmission cables result from the weight and rigidity of steel. Machinery used to manufacture cable employing steel must be capable of handling the additional weight and rigidity of steel as compared to the weight and rigidity of other power transmission and communication transmission cable components and transmission media. Weight is a disadvantage when power transmission and communications transmission cables are tethered to underwater vehicles or supported from buoys. The rigidity of cable components increases the minimum permissible radius of bend which a cable can achieve.

Additionally, while steel may be more corrosion-resistant than other materials known for use in transmission media, steel will corrode when exposed to sea water. Corrosion can weaken the steel and shorten the useful life of the cable. Hydrogen and other products generated by the corrosion of steel can adversely affect the light transmissivity of glass fiber used as a communications transmissions medium thereby degrading its performance. While it generally is known to cover with various protective jackets the steel strands used in underwater cables, the potential for puncture of the jackets is always present.

To address drawbacks involved with the use of steel, attempts have been made to fabricate cables comprised of other materials. For example, certain complex nickel alloys have excellent corrosion resistance are compatible for use in underwater cables, but their use has been limited due to the great expense involved with these alloys. Aluminum has been used to address, for example, weight and rigidity factors, but it is low in strength as compared with steel and subject to corrosion. Synthetic materials require new cable designs and new methods for terminating the cable.

With regard to terminating the cable, steel transmission cables are conventionally terminated in a socket and cone configuration, as depicted in FIGS. 3 through 5. The steel strands 5 are arranged around the inner wall 18 of a conical socket 20. A mating cone 30 is placed over the steel strands 5, inserted within socket 20, and pressed into place to form the completed termination, shown in FIG. 5. The process of terminating the steel-type transmission cable generally is very time consuming and requires the use of heavy and expensive hydraulic equipment.

Accordingly, there is a need for lighter weight, corrosion resistant strength systems for transmission cable and new methods for terminating the cables. The present invention provides a non-metallic, corrosion resistant strength system for underwater power transmission and communications transmission cables which permits higher conductivity per cable size, avoids corrosive products that decrease the light transmissivity of the optical fiber, and provides lower costs of electrical insulation, water protection, and mechanical termination.

SUMMARY OF THE INVENTION

The strength system of the present invention comprises two non-metallic strength members. Each strength member is comprised of at least one glass strand, each strand of which is comprised of a plurality of glass filaments that are bound together with a polymeric material. The first strength member is applied in a helical lay over transmission media which forms the core of the cable. The second strength member is applied over the lay of the first strength member in a helical lay having a circular direction opposite to the lay of the first strength member. In the preferred embodiment of the invention, the strength members are used in a transmission cable having copper conductors and are embedded in insulation surrounding the core and surrounded with a protective coating.

The invention further embraces a method of terminating the cable comprising the two strength systems, applying a capstan effect termination. With the termination method of this invention, the strength systems are removed from the core of the transmission cables, folded back around an inner termination cone, secured with an adhesive around the inner termination cone, and then capped with an outer termination cone that is applied over the strength members and inner termination cone. The termination method may further involve the wrapping of a polyester or aramid yarn around the strength members and inner termination cone.

BRIEF DESCRIPTION OF THE DRAWINGS

For a better understanding of the invention, an exemplary embodiment is described below, considered together with the accompanying drawings, in which:

FIG. 6 is a sectional view of a non-metallic fiber strength system installed in a deep water trunk cable.

FIG. 7 is a perspective view of the non-metallic fiber strength system installed in a deep water trunk cable shown in FIG. 6.

FIGS. 8–14 show the method of terminating the inventive cable, wherein:

FIG. 8 is a diagrammatic view of a transmission cable showing a non-metallic strength system in preparation for installation of a capstan effect coupling.

FIG. 9 is a diagrammatic view of the cable shown in FIG. 8 with an inner termination cone of capstan effect coupling.

FIG. 10 is a diagrammatic view of the cable and inner termination cone shown in FIG. 9 with strength members bent over inner termination cone and clamped.

FIG. 11 is a diagrammatic view of the cable of FIG. 10 showing strength members partially wrapped in formation of capstan termination.

FIG. 12 is a diagrammatic view of the cable of FIG. 11 with wrapping completed and strength members trimmed.

FIG. 13 is a diagrammatic view of the cable of FIG. 12 with wrapped strength members enclosed with a conical mold cavity.

FIG. 14 is a diagrammatic view of the cable of FIG. 13 with the mold removed and threaded outer termination cone installed.

Figure 1:
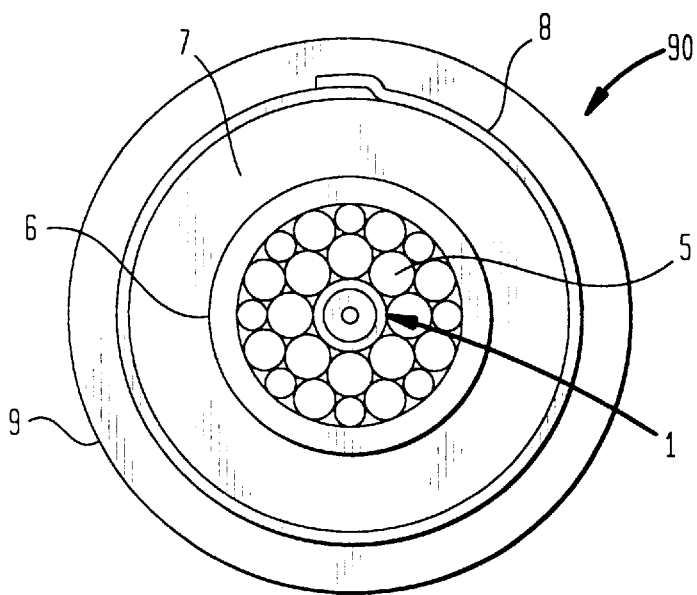
FIG. 1 is a cross-sectional view of a prior art deep water trunk cable utilizing a conventional steel system taken along the line 10—10 of FIG. 2.

It is to be understood that these drawings are for the purposes of illustrating the concepts of the invention and are not to scale.

DETAILED DESCRIPTION OF THE INVENTION

Turning now to FIGS. 6 and 7, there is shown a cross-sectional and perspective view, respectively, of a deep water trunk power and communications transmission cable 95 incorporating the principles of the invention. In this arrangement, a conventional fiber optic core structure 11, comprised of an optical fiber 12, buffer coating 13, and buffer jacket 14, has an outer diameter of about 0.0675 inches. It is surrounded with a plurality of copper conductors 15. The conductors 15 are selected and arranged to densely pack a circular cross section of about 0.210 inches in diameter surrounding the fiber optic core structure 11. The plurality of copper conductors 15 surrounding the optic core structure 11 may have identical diameters or they may have several different diameters. A welded swaged copper tube 16 with an outer diameter of about 0.250 inches surrounds the copper conductors 15.

The use of copper conductors 15 is advantageous in that the copper has higher electrical conductivity as compared with steel strands used in prior art devices. Thus, a non-metallic strength system power and communications transmission cable having approximately the same outside diameter, weight per unit length and cost per unit length, can have electrical resistance which is lowered by one-half. Cable of the same electrical resistance can be made smaller for tighter bend radii and lighter for use as tether cable or buoy cable. Moreover, cable manufacturing can be performed more readily without the heavy duty machinery needed to handle steel.

The copper conductors are protected with this invention by an arrangement of non-metallic strength systems 22, 23. However, an insulating layer 17 may first be used to surround the swaged copper tube. The insulating layer 17 may be comprised of a polyolefin material such as polyethylene. Two helical strength members 22 and 23 then surround the insulating layer, i.e., a helical lay of a first strength member 22 is applied over the insulating layer 17, and a helical lay of a second strength member 23 is applied over the first strength member 22. The circular direction of the helical lay of the first strength member 22 is opposite to the direction of the helical lay of the second strength member 23. A second optional layer of insulation 17A, an optional electrical and mechanical shield 18, and a protective jacket 19 surround the strength members 22 and 23.

Preferably, each strength member 22 and 23 is comprised of a plurality of glass strands. Each strand of the strength members in turn comprises a plurality of filaments which are gathered together and impregnated with a polymeric material. The impregnating material coats each filament, thereby protecting against abrasion and coupling each filament to its neighbor to bridge flaws and establish tensile load balance. The filaments may be assembled together so that they extend generally parallel to the longitudinal axis of the strength member.

Figure 2:
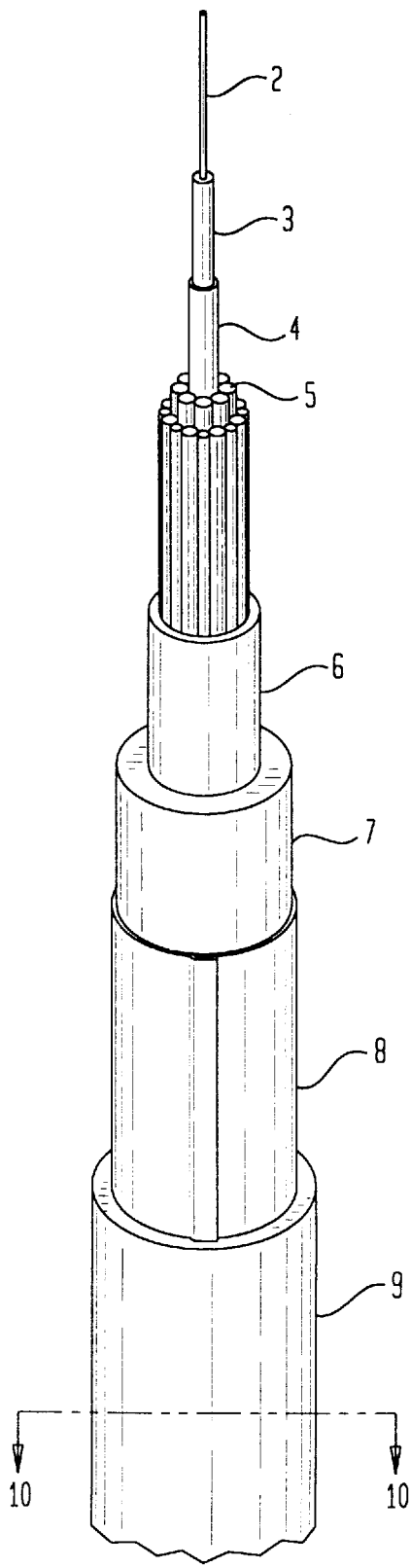
FIG. 2 is a perspective view of a prior art deep water trunk cable.
Figure 3:
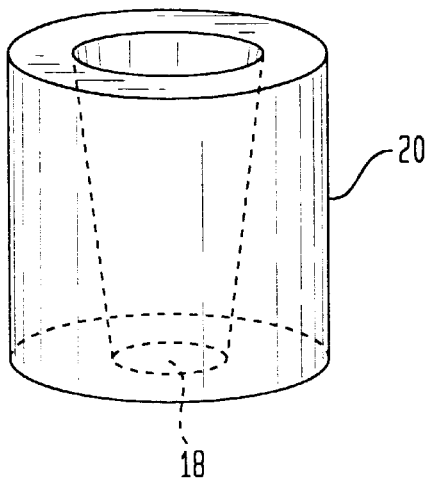
FIG. 3 is a perspective view of a prior art socket of a socket and cone termination for the deep water trunk cable shown in FIG. 1.
Figure 4:
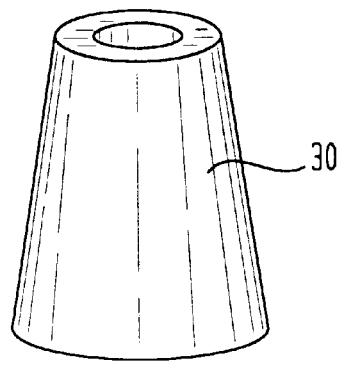
FIG. 4 is a perspective view of a prior art cone of a socket and cone termination for the deep water trunk cable shown in FIG. 1.
Figure 5:
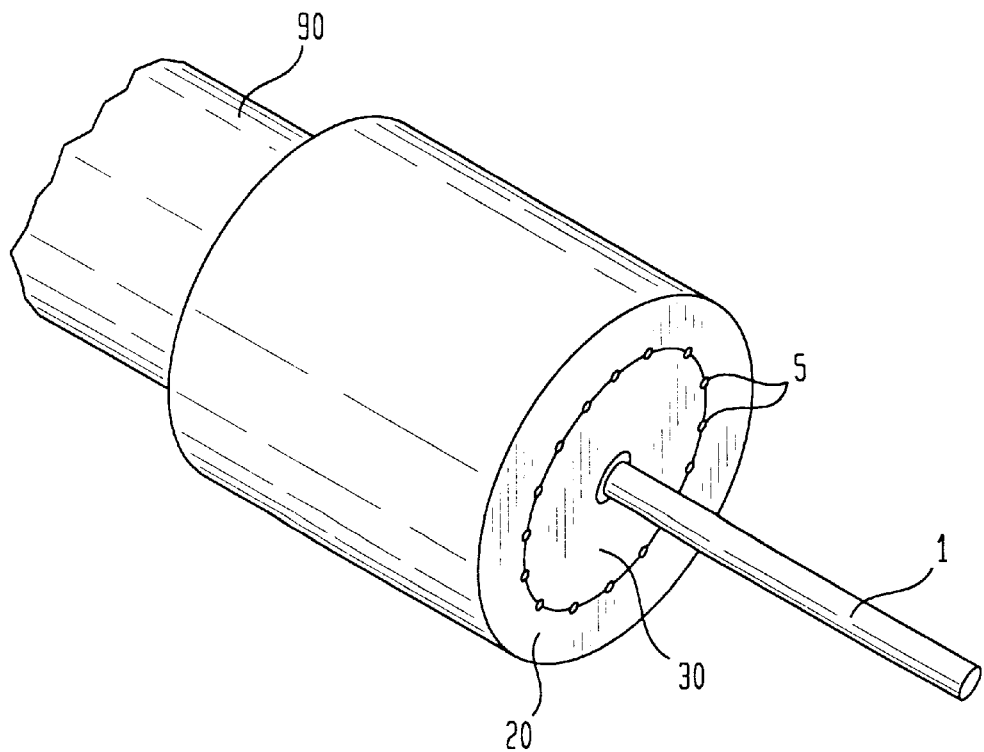
FIG. 5 is a perspective view a prior art socket and cone termination assembly for the deep water trunk cable shown in FIG. 1 using the socket and cone of FIGS. 3 and 4.

In a preferred embodiment, a cable having superior breaking strength and a maximum allowable strain comparable to the steel-type cable depicted in FIGS. 1 and 2 is achieved by employing a first strength member consisting of twenty-one strands and a second strength member consisting of twenty-four strands. Each strand of the first and second strength member consists of about eight thousand filaments coated with a polymeric fiber. Each strand has a rectangular cross section of about 0.025 by 0.090 inches and a break strength of about five hundred pounds.

In a preferred embodiment, the filaments for forming the strands are comprised of fiberglass. Polymeric materials for impregnating the filaments may include urethanes, acrylic acid or acrylate-based materials, epoxies, polyesters, and polyvinyl chloride or other vinyl based materials. Materials that may be used to impregnate the fibers of strength members, serve as coupling agents and also function as cable jacket material are disclosed in U.S. Pat. No. 4,761,053 which is incorporated herein by reference. The strands comprising the strength members may be polymeric-coated fiber glass such as HERCUFLEX® by PPG Industries and particularly HERCUFLEX® 8000.

To wrap strands of the first strength member around insulation surrounding the core of the cable (containing transmission media), standard floating carriage cable stranding apparatus may be employed. Preferably, as depicted in FIG. 6, the strands of each strength member are wrapped so that the long sides of the rectangular cross section of each strand are generally perpendicular to the radii of the circular cross section of the cable and the short sides of the rectangular cross section of each strand are, generally, parallel to radii of the circular cross section. In other words, the long sides of the rectangular cross-section of the first helical lay 22 are disposed adjacent (or aligned with) the outer circumference of the insulating layer 17, and the long sides of the rectangular cross-section of the second helical lay 23 are disposed adjacent the outer circumference of the first helical lay 22. In this way, the outer diameter of the strengthened cable may be reduced. However, the rectangular strands may be laid in a helical wrap with the long edges of the rectangular cross-section generally in co-axial alignment with the axis of the cable, so that the long sides of the rectangular cross-section of the strands extend outward from the core.

In any event, each strand is preferably directly adjacent the neighboring strand of its strength member without a space or overlap existing between strands. The strands of each strength member are wrapped so that each strand forms a helical wrap which progresses lengthwise in the direction of the cable axis. The strands of the second strength member are helically wrapped directly over the strands of the first strength member and in the opposite circular direction of the first member to torque balance the cable structure.

As depicted in FIG. 6, the adjacent long sides of the rectangular cross section of adjacent strands form a piecewise continuous circle figure in a cross section of the cable. In the preferred embodiment, the inner diameter of the first strength member is about 0.310 inches. The outer diameter of the second strength member is about 0.360 inches. An optional layer of insulation 17A and/or a jacket 19 surround the strength members. The outside diameter of the cable is about 0.460 inches. Optionally, shield 18 may be employed between insulation 17A and jacket 19 to provide electrical shielding and/or to add to the mechanical shielding provided by the strength members 22 and 23.

Strand with a circular cross section may also be used to form strength members. Cable formed with strand having a circular cross section may have an outer diameter somewhat greater than cable formed with strand having a rectangular cross section of equivalent area. However, to achieve the benefit of a smaller diameter cable by use of strand with a rectangular cross section, a floating carriage cable stranding apparatus must by employed. Cable formed of strength members consisting of strand having a circular cross section can be manufactured with fixed carriage cable stranding apparatus. Suitable strand having a circular cross section is commercially available. It also may be HERCUFLEX® 8000 strand which is available with circular as well as rectangular cross section.

Figure 8:
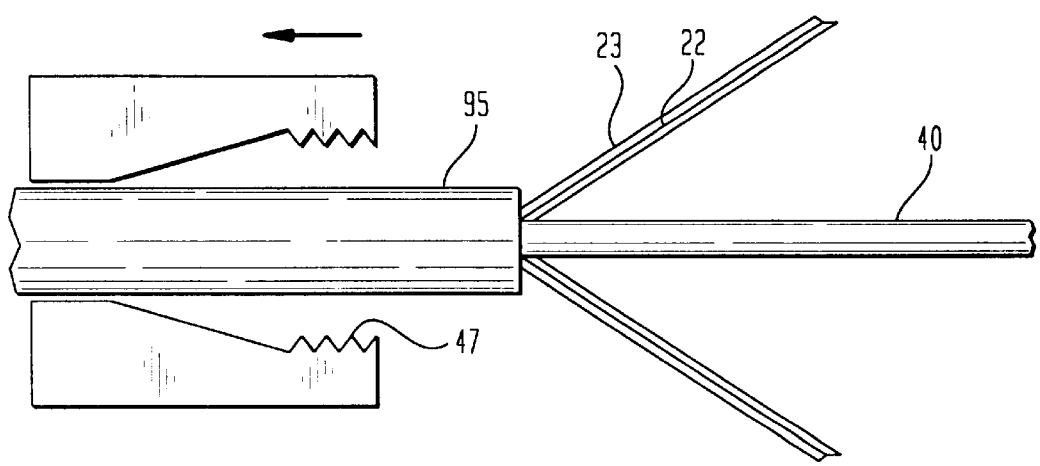

The non-metallic fiber strength system overcomes the disadvantages associated with termination of steel cable systems. Unlike with steel transmission systems, cables having non-metallic fiber strength members may be terminated by capstan effect devices. Generally FIGS. 8 through 14 illustrate a capstan effect termination for the strength system of this invention together with the method of forming such termination. FIG. 8 shows a cable 95 with the non-metallic strength system of the present invention in preparation for installation of a capstan effect termination. A length of the strength members 22, 23 have been exposed on an end segment of the cable 95. This is done by removing, at an end section of the cable, the outer jacket and shield (if used) together with all insulation exterior to the strength members. The exposed strength members are unwrapped from the cable to expose the cable core 40 (comprising the fiber core structure 11, copper conductors 15 and copper tube 16, as shown in FIGS. 6 and 7). An outer termination cone 47 may be applied over the cable 95 at the start of this process, as will be later described.

Figure 9:
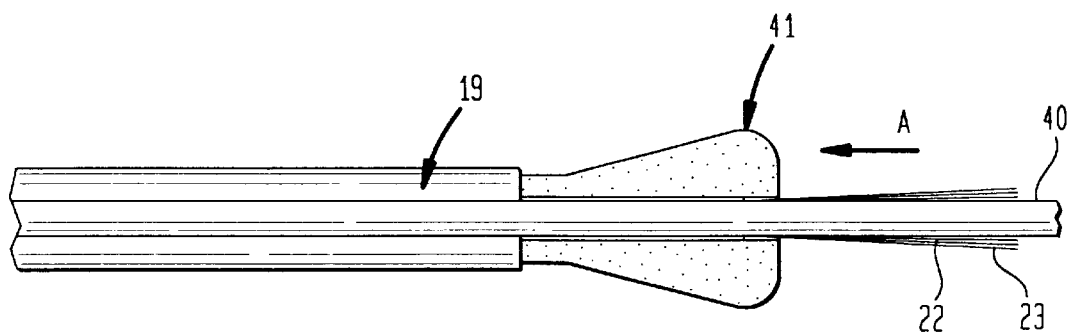
Figure 10:
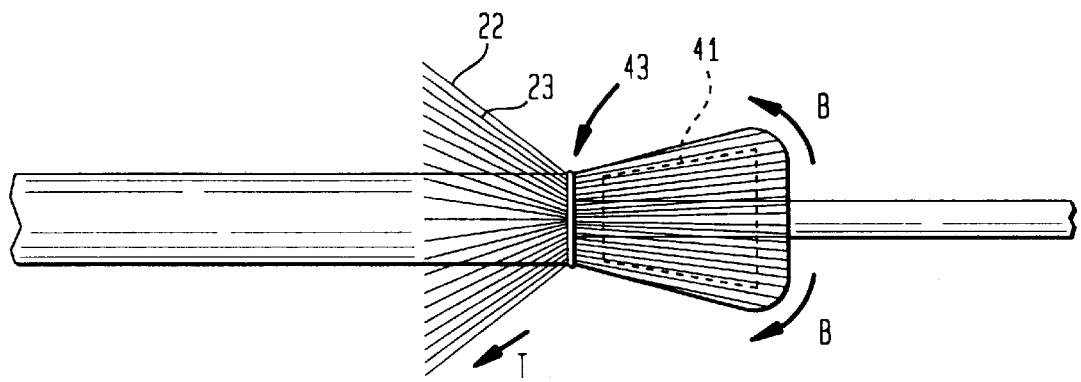

The next step of the termination method is illustrated in FIG. 9; the exposed strength members are arranged parallel to the cable core 40. An inner termination cone 41 having an inner bore to accommodate the cable core 40 is slid over the core and strength members, in the direction of arrow A, toward the jacket 19 where it remains on the cable. Next, as depicted in FIG. 10, the exposed strength members are bent over the inner termination cone 41, following arrows B. In bending the strength members, tension is applied, as required, to remove slack. Notably, the flexibility of the strength members allow for this bending and termination process, which would not be possible if a steel-type transmission cable were used. The strength members are secured with a clamp 43 to the outer jacket 19. Clamp 43 may form part of the final capstan termination or be temporarily employed during formation of the termination. The clamp 43 is shown as a substantially circular clamp 43 encircling the diameter of the termination cone 41 and allowing the free ends of the strength members to protrude in the direction of the covered cable opposite the termination end. Again, as the clamp is secured, tension may be applied in the direction of arrow T so that the strength members fit snugly around the termination cone 41.

Figure 11:
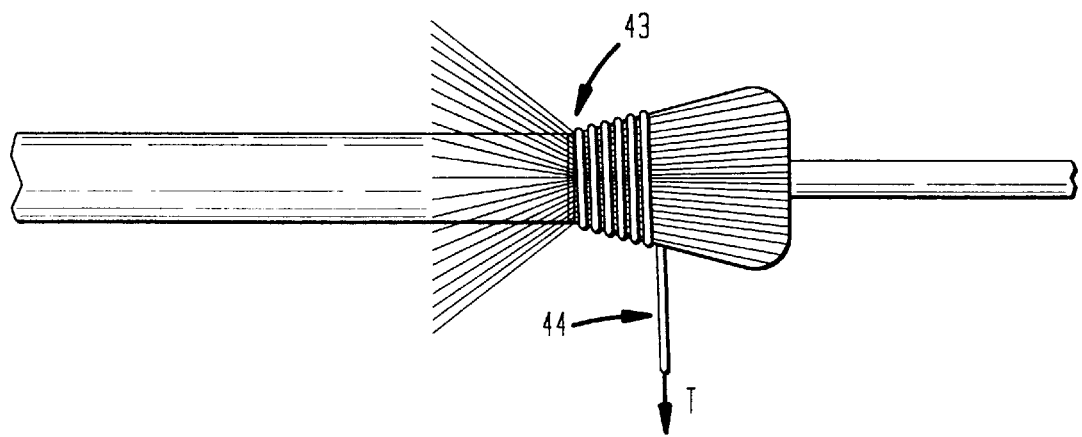
Figure 12:
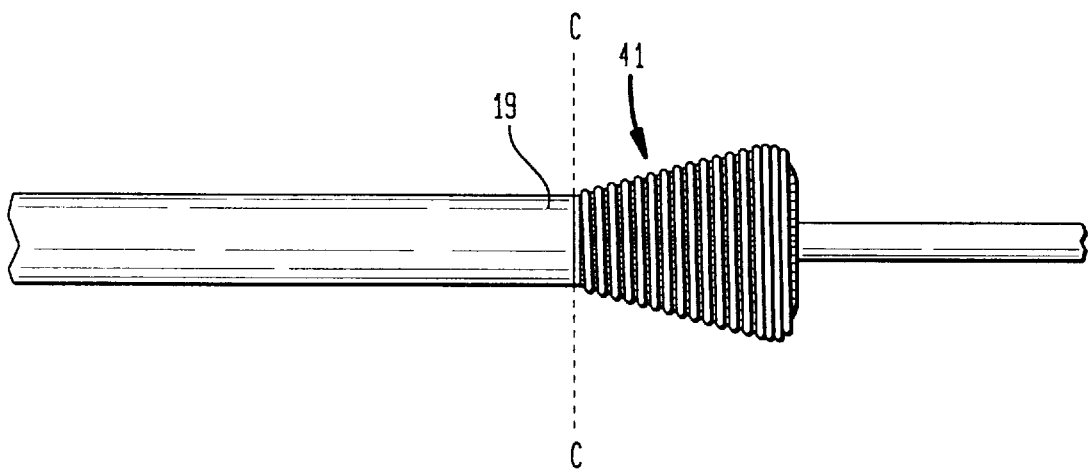

FIG. 11 shows the next step, that is, wrapping of the exposed strength members with a polyester or aramid yarn 44. One end of the yarn 44 is secured to the clamp 43, and the length of the yarn 44 is wrapped over the strength members on the outer surface of the inner termination cone 41. Tension is applied to the yarn 44 throughout the wrapping operation, as per arrow T. FIG. 12 shows the next steps in the formation of the termination. The fully wrapped strength members are trimmed along the edge of the inner termination cone 41, as per the hatched line C—C, adjacent the cable jacket 19.

Figure 13:
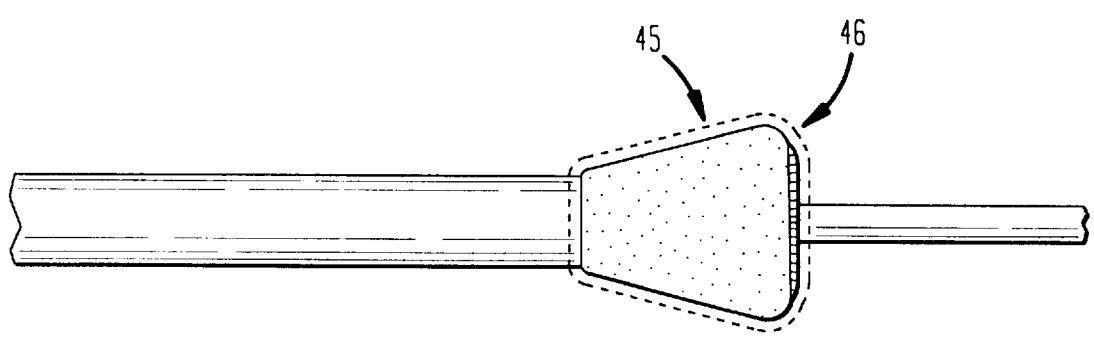

As shown in FIG. 13, a conical mold cavity 45 is next placed over the inner termination cone 41 and strength members wrapped in yarn 44. An adhesive or epoxy is inserted into the space 46 between the mold cavity 45 and the inner termination cone 41 and wrapped strength members. With this adhesive or epoxy, the termination can be made water tight and provide an additional water barrier for the cable. An adhesive or epoxy material should be used that is compatible with and couples to the cable jacket and insulation as well as the fiberglass or the polymeric material used to impregnate the filaments of the strands of the strength members and the yarn used to wrap the strength members. Materials that advantageously may be used for the adhesive comprise the polymeric material used to impregnate the strands (e.g., silanes described in U.S. Pat. Nos. 4,761,053 and 4,479,984, urethanes, acrylic acid or acrylate-based materials, epoxies, polyesters, and polyvinyl chloride or other vinyl-based materials), thermoplastics that bond to the impregnating material, or epoxy.

Figure 14:
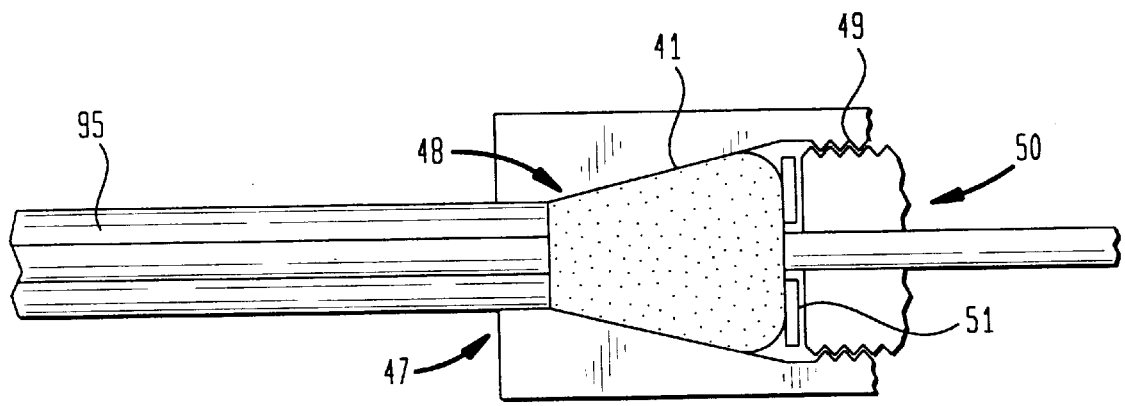

Once the adhesive cures, the mold is removed. FIG. 14 illustrates the final steps of the termination process. An outer termination cone 47 with an inner bore 48 having dimensions corresponding to the outer dimensions of the inner termination cone 41 is slid over the latter (the inner cone 41 having been prepared with the threaded yarn 44 and adhesive, as previously described). The bore 48 has threads 49 at one end. To ease in the step of securing this outer termination cone 47 over the inner cone 41, it may be placed on the cable 95 at the start of termination process, as previously noted with reference to FIG. 8. Otherwise, it may be necessary to pass this outer cone 47 over the length of the cable 95, due to the differential diameter of the bore 48 relative to the outer diameter of the inner cone 41. In any event, the threaded outer termination cone 47 is slid over the prepared inner termination cone 41 and screwed onto a threaded mating assembly 50. A compression washer 51 may be disposed between the mating assembly 50 and threaded outer termination cone 47 (and/or inner termination cone 41). The threaded outer cone 47 is tightened to develop a compressive pre-load on the strength members.

It should be readily apparent that a transmission cable utilizing the non-metallic strength system of this invention has several advantages. The torque balanced cable will resist twisting under action of external torque loads applied on either circular direction and will develop equal and opposite balanced internal torque loads when the cable is in tension. Corrosion resistant fiber strength members do not produce corrosion products that will cause optical fiber loss. Space typically used in transmission cable for steel strength members can be filled with low resistance electrical conductors. A non-metallic strength system power and communications transmission cable having approximately the same outside diameter, weight per unit length and cost per unit length, can have electrical resistance which is lowered by one-half. Cable of the same electrical resistance can be made smaller for tighter bend radii and lighter for use as tether cable or buoy cable. Moreover, cable manufacturing can be performed more readily and the cables can be terminated without the heavy duty machinery needed to handle steel.

It will become apparent to those skilled in the art that various modifications to the strength system of the preferred embodiment can be made, as well as modifications to the method of termination, without departing from the spirit of the invention. All such variations and modifications are intended to be included within the scope of the appended claims.

What is claimed is:

1. A method for terminating a transmission cable comprising strength members wrapped around a core structure containing transmission media, the method comprising the steps of:

(a) providing an inner termination cone and an outer termination cone, wherein the inner termination cone has an internal channel and an external surface, and the outer termination cone has a bore configured to receive the inner termination cone;

(b) removing a firs length of the strength members from the core structure of the transmission cables to provide exposed strength members, (c) folding back at least a portion of the exposed strength members so that at least the portion of the exposed strength members is placed against the external surface of the inner termination cone, the inner termination cone having been placed over the core structure so that the strength members have a second length disposed in the internal channel between the core structure and the inner termination cone;

(d) applying an adhesive to the exposed strength members located on the external surface, and (e) securing the outer termination cone over the inner termination cone and exposed strength members and adhesive placed thereon.

2. The method according to claim 1, in which the adhesive is selected from the group consisting of a silane impregnating material having an organo-functional group selected to couple to the filaments, a thermoplastic material for bonding to the impregnating material, and epoxy.

3. The method of claim 1, in which each strength member comprises at least one strand and each strand comprises a plurality of filaments that are bound together and impregnated with a polymeric material.

4. The method of claim 1, in which a layer of conductive material concentrically surrounds the core structure, and the internal channel of the inner termination cone is sized for the threading of the core structure, the conductive material, and the strength members through the channel.

5. The method according to claim 1, further comprising the step of wrapping a length of yarn around the inner termination cone and exposed strength members folded back onto the inner termination cone before the adhesive or epoxy is applied, wherein the yarn is comprised of a polyester or aramid yarn.

6. The method according to claim 1, further comprising the step of clamping the exposed strength members on the inner termination cone.

7. The method according to claim 5, further comprising the steps of placing a removable mold over the inner termination cone, the exposed strength members, and the yarn before the adhesive is applied and removing the mold once the adhesive has cured.

8. The method according to claim 5, further comprising the steps of placing the outer termination cone over the inner termination cone, the exposed strength members, and the yarn and injecting a thermoplastic between the inner and outer termination cone which bonds to the exposed strength members and the yarn.

9. The method of claim 1, in which the transmission cable comprises an outer jacket surrounding the strength members and further comprising the step of removing the outer jacket from the strength members before the strength members are removed from the core structure.

10. The method of claim 1, wherein the step of removing the length of strength members comprises unwrapping a length of strength members from the core structure to provide exposed strength members wherein the length of the exposed strength members is greater than the length of the inner termination cone.

11. A method for terminating a transmission cable comprising strength members wrapped around a core structure containing transmission media, the method comprising the steps of:

(a) providing an inner termination cone, an outer termination cone, wherein the inner termination cone has a first end and a second end, an internal channel opening to the first and second ends, and an external surface, and the outer termination cone has a bore configured to receive the inner termination cone;

(b) placing the inner termination cone over the transmission cable so that the transmission cable runs through the internal channel from the first to the second ends;

(c) removing a length of the strength members from the core structure adjacent to the first end of the inner termination cone to provide exposed strength members;

(d) folding back at least a portion of the exposed strength members over the external surface of the inner termination cone toward the second end so the exposed strength members rest against the external surface of the inner termination cone from the first end toward the second end;

(e) wrapping a length of yarn around the exposed strength members and external surface of the inner termination cone, the length of yarn being wrapped circularly about the inner termination cone between the first and second ends;

(f) applying an adhesive to the exposed strength members and length of yarn on the external surface; and (g) securing the outer termination cone over the inner termination cone wherein the outer termination cone is placed over the exposed strength members, yarn and adhesive.

12. A method for terminating a transmission cable comprising strength members wrapped around a core structure containing transmission media, the method comprising the steps of:

(a) providing an inner termination cone, an outer termination cone, and a mating assembly, wherein the inner termination cone has a first end and a second end, an internal channel opening to the first and second ends, and an external surface; the outer termination cone has two ends, a bore opening to the two ends and dimensioned to receive the inner termination cone therein, the bore having first threads adjacent one of the two ends; and the mating assembly has second threads dimensioned to mate with the first threads on the bore;

(b) placing the inner termination cone over the transmission cable so that the transmission cable runs through the internal channel from the first to the second ends;

(c) removing a section of the length of the strength members from the core structure adjacent the first end of the inner termination cone to provide exposed strength members, (d) folding back at least a portion of the exposed strength members over the external surface of the inner termination cone toward the second end so that the strength members simultaneously have a first length sandwiched between the core structure and the inner termination cone and a second length resting against the exterior surface of the inner termination cone from the first to the second end;

(e) wrapping a length of yarn around the exposed strength members and external surface of the inner termination cone, the length of yarn being wrapped circularly about the inner termination cone between the first and second ends;

(f) applying an adhesive to the exposed strength members and length of yarn on the external surface;

(g) securing the outer termination cone over the inner termination cone so that the threads of the bore are adjacent the first end of the inner termination cone; and (h) threading the mating assembly to the outer termination cone to close the bore.

* * * * *